US007864676B2

(12) United States Patent
Chakravorty (10) Patent No.: US 7,864,676 B2
(45) Date of Patent: Jan. 4, 2011

(54) NETWORK CROSS-DOMAIN PRECEDENCE AND SERVICE QUALITY CONFLICT MITIGATION

(75) Inventor: Sham Chakravorty, McLean, VA (US)

(73) Assignee: The MITRE Corporation, McLean, VA (US)

(*) Notice: Subject to any disclaimer, the term of this patent is extended or adjusted under 35 U.S.C. 154(b) by 197 days.

(21) Appl. No.: 12/172,494

(22) Filed: Jul. 14, 2008

(65) Prior Publication Data

US 2010/0008228 A1     Jan. 14, 2010

(51) Int. Cl.
*H04L 1/00*     (2006.01)
(52) U.S. Cl. ........................... 370/230; 370/235
(58) Field of Classification Search ......... 370/229–325, 370/412–418
See application file for complete search history.

(56) References Cited

U.S. PATENT DOCUMENTS

| | | | | |
|---|---|---|---|---|
| 6,091,709 | A * | 7/2000 | Harrison et al. | 370/235 |
| 6,742,016 | B1 * | 5/2004 | Bhoj et al. | 709/207 |
| 6,940,813 | B2 * | 9/2005 | Ruutu | 370/231 |
| 7,027,414 | B2 * | 4/2006 | Walsh et al. | 370/316 |
| 7,209,437 | B1 * | 4/2007 | Hodgkinson et al. | 370/230 |

OTHER PUBLICATIONS

Chakravorty, A Tiered Model for CROS-Domain QoS Deliveries, IEEE, 10 pages, 2007.*
Almquist, Type of Service in the Internet Protocol Suite, RFC 1349, 28 pages, Jul. 1992.*
Nichols et al, Definition of the Differentiated Services Field (DS Field) in the IPv4 and IPv6 Headers, RFC 2474, 20 pages, Dec. 1998.*
Baker et al, Implementing an Emergency Telecommunications Service (ETS) for Real-Time Services in the Internet Protocol Suite, RFC 4542, 42 pages, May 2006.*

* cited by examiner

*Primary Examiner*—Frank Duong
(74) *Attorney, Agent, or Firm*—Sterne, Kessler, Goldstein & Fox P.L.L.C.

(57) ABSTRACT

A method, computer program product, and system are provided for prioritizing data in a network system. For example, an embodiment of the method may include allocating network system resources to high-priority data with an identifier and dynamically changing a threshold level from a pre-assigned, minimum level in the allocation of network resources based on data traffic with the identifier received by a communication device in the network system. In allocating network system resources, the data with the identifier may be filtered into a separate data stream from data without the identifier. For instance, the data stream containing data with the high-priority identifier may be directed to a high-priority buffer that has a minimum allocation of network resources dedicated to the buffer to ensure unencumbered data transfer between the communication device and a destination within the network system. Further, in dynamically changing the threshold level, network resources may be allocated to data with a high-priority identifier as the high-priority data is received by the communication device. A prioritization of network resource queue space for the data with the high-priority identifier and then a prioritization of data without the high-priority identifier in the remaining queue space, if any, according to Quality of Service (QoS) requirements may be required when allocating network resources. Therefore, the method described above may be used to propagate prioritized data across a network while accommodating for QoS requirements.

18 Claims, 5 Drawing Sheets

NETWORK CROSS-DOMAIN PRECEDENCE AND SERVICE QUALITY CONFLICT MITIGATION

BACKGROUND

1. Field

The present invention relates generally to data networking. More specifically, the present invention relates to prioritizing data packets in a data network system according to an identifier associated with the data packet.

2. Background

Quality of Service (QoS) in computer networking commonly refers to the ability for a data network to provide a certain level of performance to a data flow. The level of performance may be measured by technical metrics, such as delay, data packet loss, and jitter. QoS provisions are important if a data network's capacities are insufficient, especially for time-sensitive applications (e.g., voice over IP or real-time streaming of multimedia) and in networks where capacity is a limited resource (e.g., in cellular data communication). As such, QoS is an important factor in ensuring that appropriate network resources are allocated to these applications.

QoS becomes more complicated when a precedence of a message is coupled with QoS technical requirements. A precedence may refer to a preferential treatment of a message over other messages in the data network. For example, a message relating to an emergency situation may be treated with preferential treatment by the data network (e.g., the message is given a top priority status to data network resources) and propagated through the network more rapidly than a message without such priority. In the instance that the data network is faced with a high volume of both high-priority data and low-priority, time-sensitive data, the network faces a difficult challenge in balancing precedence and QoS to ensure that appropriate network resources are allocated to this data traffic. Moreover, as the granularity of precedence and QoS requirements decreases, the efficiency and effectiveness of the data network decreases as well.

Accordingly, what is desired is a method to propagate data across a network that provides precedence to prioritized data while accommodating for QoS technical requirements.

SUMMARY

Embodiments of the invention include a method for prioritizing data in a network system. The method may include allocating a predetermined level of network system resources to data with an identifier (e.g., identifier in a data packet header) and dynamically changing a threshold level in the allocation of network resources based on data traffic with the identifier received by a communication device (e.g. a router). Data in the network system may be tagged with an identifier, where the identifier may indicate a precedence level and Quality of Service (QoS) requirement of the data. For example, the identifier may indicate that a data packet is high priority.

In dynamically changing the threshold level, network resources may be allocated to data with the identifier as the data is received by the communication device. A prioritization of network resource queue space for the data with the high-priority identifier and then a prioritization of data with a low priority identifier or with no identifier (e.g., a null identifier) in the remaining queue space, if any, according to QoS requirements may be required when allocating network resources.

When routing data with the identifier to the node in the network system, the data may be routed to another communication device in the network system, where the communication device handles incoming data traffic in the same manner described above with respect to allocating network system resources to data with the identifier and dynamically changing the threshold level in the allocation of network resources based on data traffic. Data with the low priority identifier or without the identifier may have to be discarded when routing data to the node in the network system because data with the high-priority identifier may occupy the entire network resource queue space.

Embodiments of the invention additionally include a computer program product comprising a computer-usable medium having computer program logic recorded thereon for enabling a processor to prioritize data in a network system. The computer program logic may include an allocating means for enabling a processor to allocate network system resources to data with an identifier and a changing means for enabling a processor to dynamically change a threshold level in the allocation of network resources based on a volume of data with the identifier received by a communication device in the network system. The computer program logic may additionally include a routing means for enabling a processor to route data with the identifier to a node in the network system and a routing means for enabling a processor to route data without the identifier to the node in the network system, if network resource queue space is available for the data without the identifier.

Embodiments of the invention further include a system capable of prioritizing data in a network system. The system may include a first module to allocate network system resources to data with an identifier and a second module to dynamically change a threshold level in the allocation of network resources based on data traffic with the identifier received by a communication device in the network system. Furthermore, the system may include a third module to route data with the identifier to a node in the network system and a fourth module to route data without the identifier to the node in the network system, if network resource queue space is available for the data without the identifier.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

The present invention will now be described with reference to the accompanying drawings. In the drawings, generally, like reference numbers indicate identical or functionally similar elements. Additionally, generally, the left-most digit (s) of a reference number identifies the drawing in which the reference number first appears.

DETAILED DESCRIPTION

A tiered design is required that essentially protects against a potential shortage of resources for a particular type of data traffic by establishing a dynamic threshold level in a network resource queue to allocate optimal network resources to data residing above the threshold level (e.g., high-priority data). The tiered design may also consider other types of data traffic falling below the dynamic threshold level (e.g., low-priority data) and ensure QoS guarantees for this type of data.

In the following description, for purposes of explanation, numerous specific details are set forth in order to provide a thorough understanding of embodiments of the present invention. It will be evident, however, to one skilled in the relevant art that the present invention may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

Figure 1:
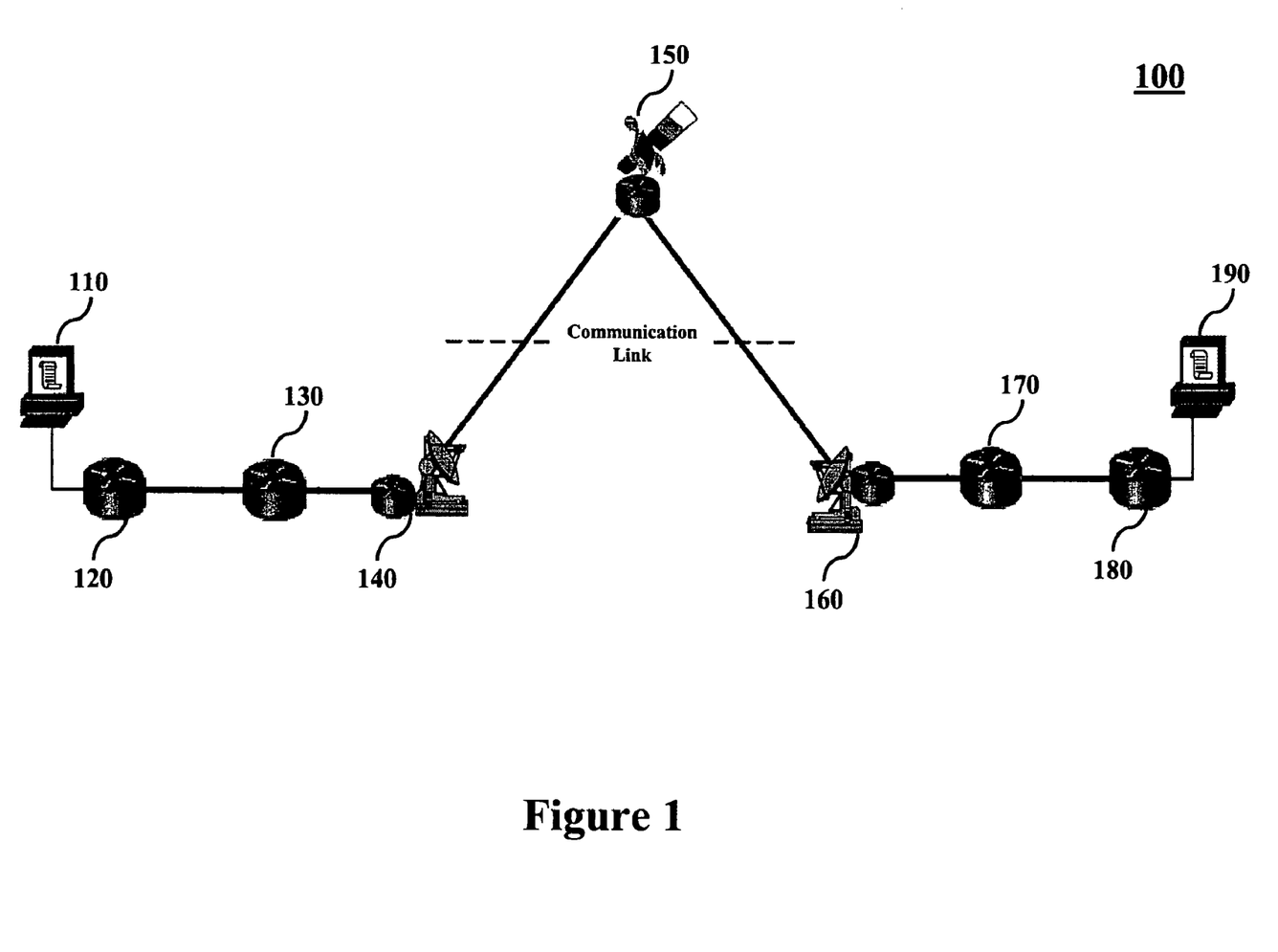
FIG. 1 illustrates an embodiment of a data network in which the present invention may be implemented.
Figure 2:
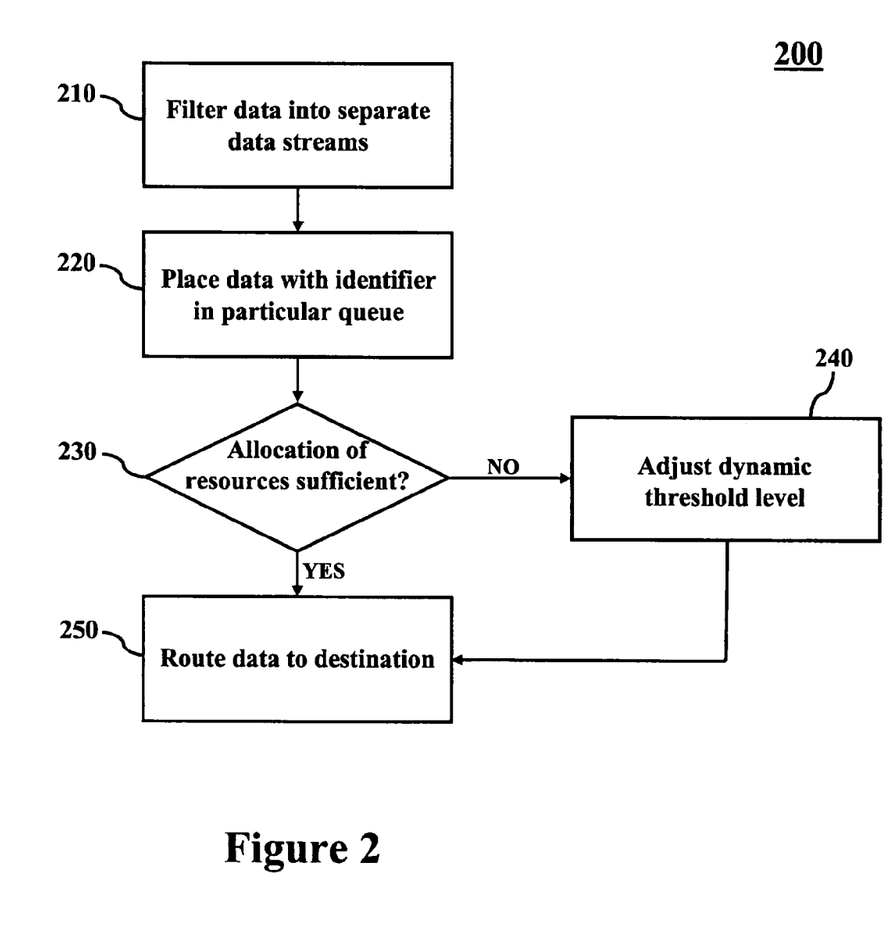
FIG. 2 illustrates an embodiment of a method for prioritizing data in a network system.

FIG. 2 illustrates an embodiment of a method 200 for prioritizing data in a network system. Method 200 may occur, for example, using data network 100. In step 210, data with an identifier is filtered into a separate data stream from data without the identifier. In one embodiment, a communication device (e.g., a router) in the network system may filter incoming data into a plurality of data streams based on information contained in the header of data packets. Data packet headers contain control information to provide a data network with information required to deliver the data, such as source and destination addresses, type of service (differentiated service code point field), traffic class, and flow label. Data packet headers may have a variety of formats depending on the network protocol, such as, for example, Internet Protocol version 4 (Ipv4) and Internet Protocol version 6 (Ipv6).

In one embodiment, when filtering incoming data into separate data streams, the communication device may filter the data based on information in the data packet header. For example, the communication device may filter data based on a particular destination address or traffic class. A person skilled in the relevant will appreciate that other fields in the data packet header may be used to filter incoming data and, moreover, more than one field in the data packet header may be used to filter the incoming information.

In one embodiment, the data packet header may be encoded with an identifier to indicate a precedence level (e.g., a high-priority identifier). For example, a differentiated services field in an IPv4 data packet header may be encoded with binary information (i.e., '0' or '1') to indicate high priority. In the alternative, other means to tag or mark data packets indicating precedence levels may be used. The tagging of packet data with particular identifiers is known to those persons skilled in the relevant art. The communication device may filter incoming data into a plurality of data streams based on this information; for example, data tagged with a high-priority identifier may be filtered into one data stream, while data without the high-priority identifier may be directed to another data stream.

Figure 3:
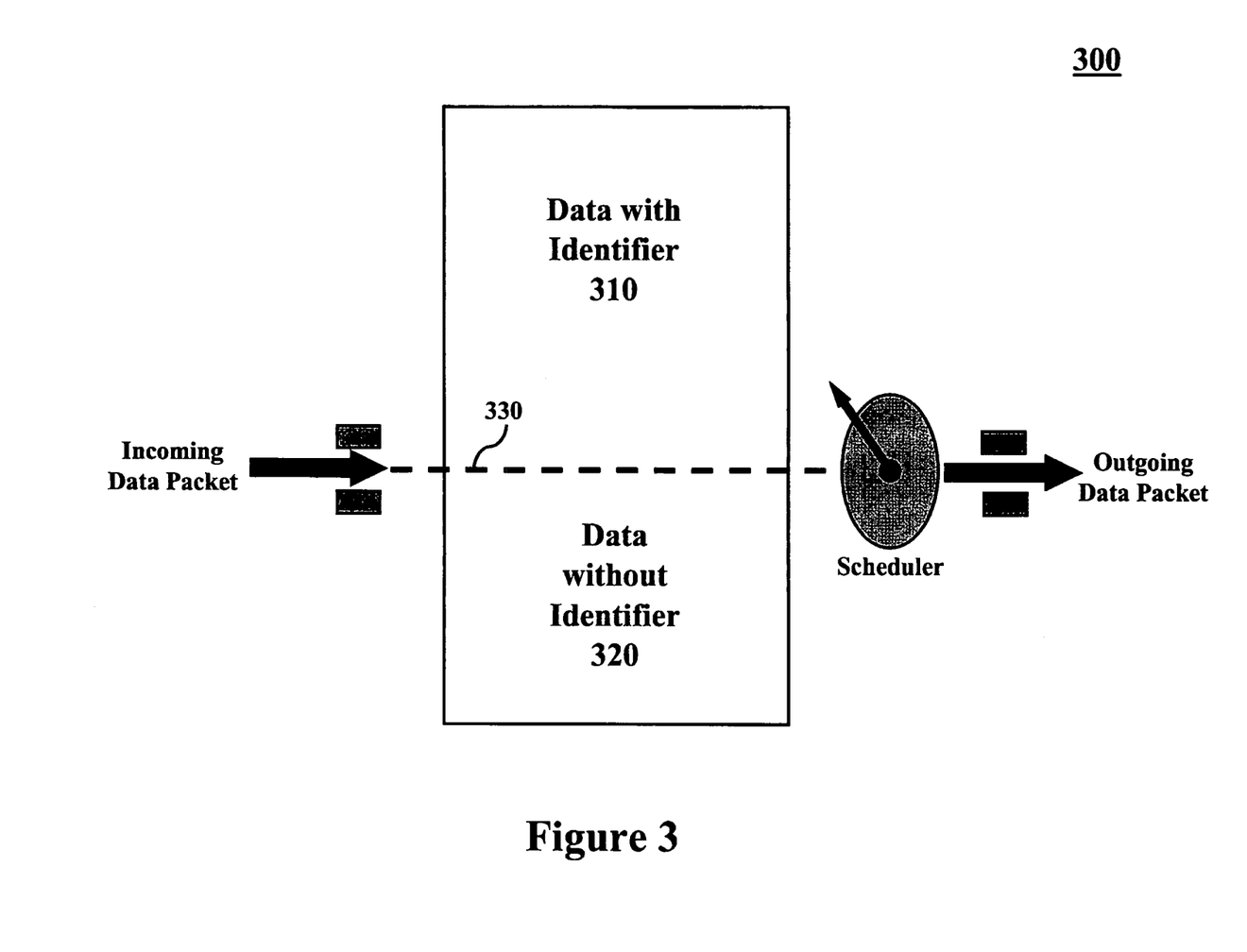
FIG. 3 illustrates an example network resource queue that allocates queue space for both data with an identifier and data without the identifier.

In step 220, data with the identifier is placed in a network queue within a communication device. In one embodiment, high-priority data may be placed in a high-priority buffer that has a predetermined minimum allocation of network resources dedicated to the buffer to ensure unencumbered high-priority data transfer between the communication device and a destination within the network system. Incoming data without the identifier or with no identifier (e.g., null identifier) may also be placed in the queue within the communication device only if there is sufficient queue space available. FIG. 3 illustrates an example network resource queue 300 that allocates queue space for both data with the identifier 310 and data without the identifier 320, as well as a dynamic threshold level 330 that adjusts according to incoming data traffic with the identifier 310 that is received by the communication device.

In step 230, the communication device determines whether an allocation of network resources is sufficient for the stream of data with the identifier. In one embodiment, traffic engineering techniques and feedback from a network management system may be used to ascertain a priori a minimum resource allocation for data traffic with the identifier (e.g., high-priority data traffic). For example, these techniques take into account flow management between nodes in the data network and the sufficiency of network resources for a particular data flow. These techniques, as well as other well-known techniques, are used in many data network implementations to assess data traffic control and management and thus are known to those skilled in the relevant art.

If the allocation of network resources is not sufficient, step 240 establishes a dynamic threshold level 330, as illustrated in FIG. 3, to protect against a potential shortage of resources for data with the identifier. In one embodiment, for high-priority data traffic, step 240 provides preferential treatment to high-priority data at the expense of data without the high-priority identifier (e.g., low-priority data traffic). That is, where available network resource bandwidth is so small such that service differentiation cannot be maintained for all data traffic classes, priority treatment will dedicate as much network resources to the high-priority data traffic as needed. In other words, if low-priority data is placed in the queue for available network resources and the remaining queue space cannot accommodate incoming high-priority data traffic, then dynamic threshold level 330 will adjust accordingly to provide queue space for the high-priority traffic at the expense of low-priority traffic. Dynamic threshold level 330 may be adjusted to a level to accommodate incoming high-priority data traffic such that low-priority data may be discarded from network resource queue 300.

In one embodiment, dynamic threshold level 330 adjusts according to incoming high-priority data traffic received by the communication device. The volume of incoming high-priority data traffic may change over time and as such, dynamic threshold level 330 adjusts accordingly to accommodate for the high-priority data traffic flow. The remaining queue space, if any, may be allocated to low-priority traffic.

Unlike a conventional signaled, reservation process, the high-priority data buffer, described in one embodiment of step 220, does not wait until a reservation for high-priority data is confirmed. Rather, the high-priority data buffer adjusts dynamically (e.g., via dynamic threshold level 330) and allocates network resources to high-priority data in real-time according to an incoming flow of high-priority data traffic. Thus, method 200 decreases end-to-end delay in the communication of high-priority data as compared to the signaled, reservation process.

Further, an embodiment of method 200 prioritizes all network resources to high-priority data and then allocates network resource bandwidth to low-priority data, if bandwidth is available. In prioritizing network resources to high-priority data, at the expense of low-priority data, embodiments of method 200 handle incoming data in real-time rather than establishing reservations like the signaled, reservation process. In other words, embodiments of method 200 adjust network resource bandwidth as data is received by a communication device rather than reserving network resources to incoming data with the risk of tearing down established reservations due to incoming high-priority data, which may cause a significant disruption in data flow.

Returning to step 240, in one embodiment, data may be prioritized within its respective queue. For instance, in the queue space occupied by the data with the identifier (e.g., high-priority identifier), the data may be prioritized within the queue space according to a number of factors, such as data type or source/destination address.

Likewise, data without the identifier may also be prioritized in its respective queue when queue space is available for this type of data. For example, data without the identifier may be prioritized according to QoS requirements or data type.

In step 250, data in the network resource queue is routed to a node in the network system. For example, data in the network resource queue may contain data with the identifier and data without the identifier. In this case, both sets of data are routed to the node in the network system. In another example, due to a high volume of data with the identifier, data in the network resource queue may contain only data with the identifier. Conversely, due to a lack of data traffic with the identifier, data in the network resource queue may contain only data without the identifier.

In one embodiment, the node receiving the data (with or without the identifier) may be another communication device (e.g., router) in the network system. This communication device would handle incoming data traffic in the same manner described with respect to steps 210 to 240. In the alternative, the node receiving the node may be other devices in the network system, such as, for example, a computer intended to receive the data or a satellite terminal or system configured to relay the data to another network system.

A person skilled in the art will appreciate that, although method 200 distinguishes data based on one identifier (e.g. high-priority identifier), data received by the communication device may be tagged with a plurality of identifiers (e.g., null, low-, medium-, and high-priority identifiers). Based on these plurality of identifiers, incoming data may be filtered into a plurality of data streams and placed in a network resource queue by the communication device.

The communication device may determine an allocation of network resources for these streams of data with the plurality of identifiers. The allocation of network resources for each type of data stream may be design-specific, where the network design may require more network resources allocated to one type of data stream than another type of data stream. In light of the network resource allocation for each type of data stream, a plurality of dynamic threshold levels may be established.

Figure 4:
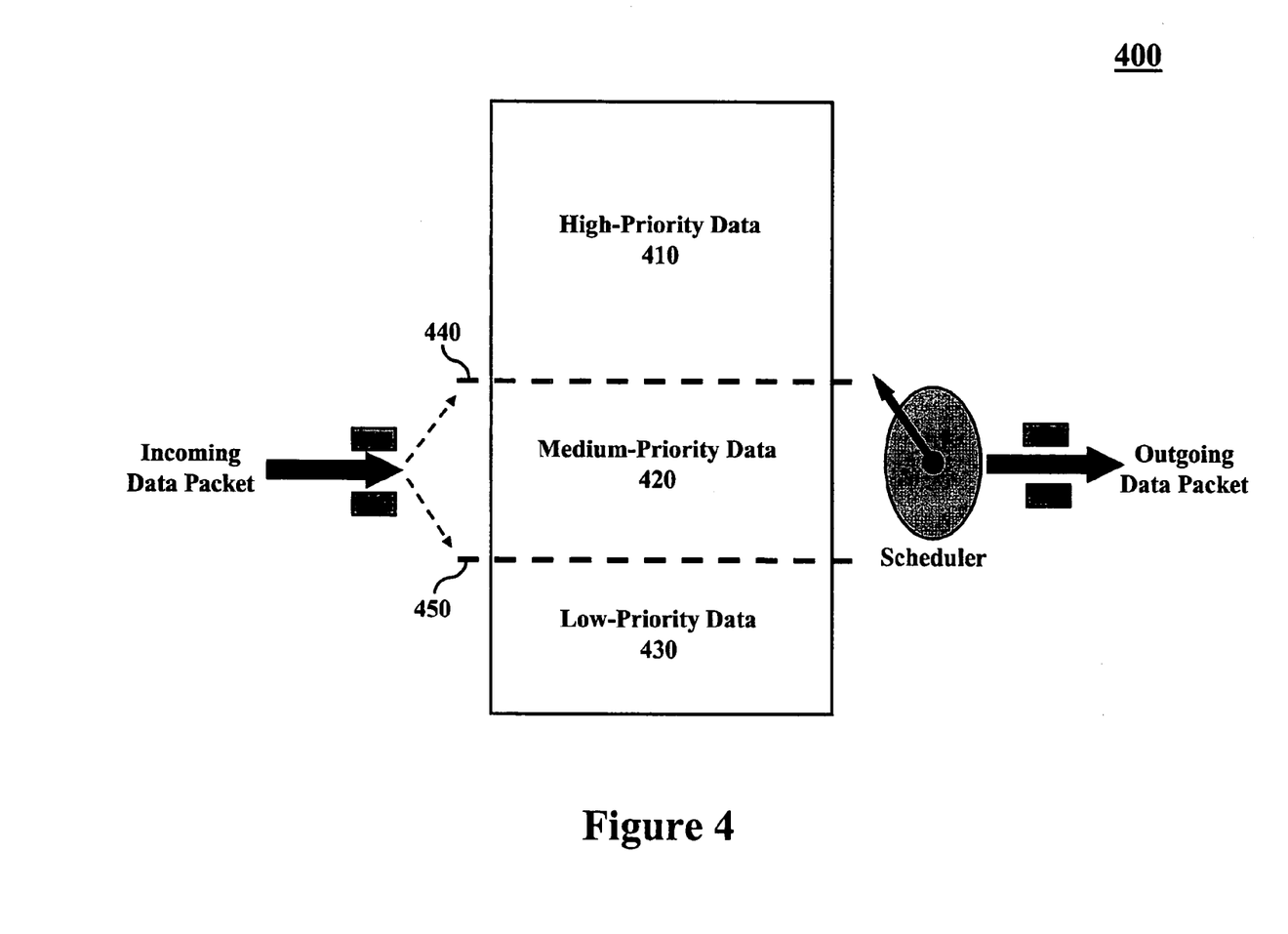
FIG. 4 illustrates an example network resource queue that allocates queue space for high-priority data, medium-priority data, and low-priority data.

For example, suppose the communication device filters incoming data traffic according to low-, medium-, and high-priority identifiers. FIG. 4 illustrates an example network resource queue 400 that allocates queue space for data with the high-priority identifier 410, data with the medium-priority identifier 420, and data with the low-priority identifier 430, as well as dynamic threshold levels 440 and 450, for high- and medium-priority data, respectively, that adjust based on data traffic with the medium- and high-priority identifiers that is received by the communication device. The communication device determines the allocation of network resources appropriate for each tier of queue space 410, 420, and 430.

For instance, the communication device may maintain that preferential treatment is given to high-priority data at the expense of medium- and low-priority data. As such, dynamic threshold level 440 may start with a minimum pre-assigned allocation of resources and adjust according to the volume of incoming high-priority data traffic. In the remaining network resource queue space, dynamic threshold level 450 may adjust according to the volume of incoming medium-priority traffic at the expense of low-priority data. In turn, the remaining network resource queue space, if any, is allocated to low-priority data 430. As medium- and high-priority data traffic is received by the communication device, dynamic threshold levels 440 and 450 adjust according to the volume of data traffic from each type of data. The data in network resource queue 400 may be routed to a node in the network system according to step 250 in method 200.

Figure 5:
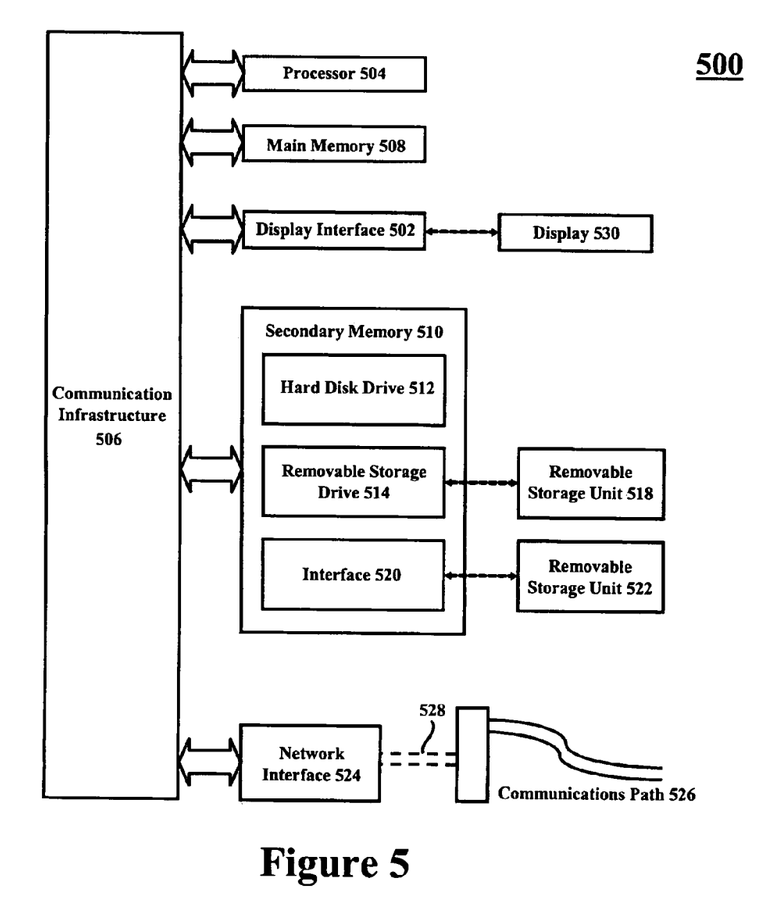
FIG. 5 illustrates an embodiment of a computer system in which the present invention may be implemented.

Various aspects of the present invention may be implemented by software, firmware, hardware, or a combination thereof. FIG. 5 illustrates an example computer device or network system 500, hereinafter referred to as a computer system, in which the present invention, or portions thereof, may be implemented as computer-readable code. For example, the methods illustrated by flowchart 200 of FIG. 2 may be implemented in system 500. Various embodiments of the invention are described in terms of this example computer system 500. After reading this description, it will become apparent to a person skilled in the relevant art how to implement the invention using other computer systems and/or computer architectures.

Computer system 500 includes one or more processors, such as processor 504. Processor 504 may be a special purpose or a general purpose processor. Processor 504 is connected to a communication infrastructure 506 (e.g., a bus or network).

Computer system 500 also includes a main memory 508, preferably random access memory (RAM), and may also include a secondary memory 510. Secondary memory 510 may include, for example, a hard disk drive 512, a removable storage drive 514, and/or a memory stick. Removable storage drive 514 may comprise a floppy disk drive, a magnetic tape drive, an optical disk drive, a flash memory, or the like. The removable storage drive 514 reads from and/or writes to a removable storage unit 518 in a well known manner. Removable storage unit 518 may comprise a floppy disk, magnetic tape, optical disk, etc., which is read by and written to by removable storage drive 514. As will be appreciated by persons skilled in the relevant art, removable storage unit 518 includes a computer-usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as those found in video game devices), a removable memory chip (e.g., EPROM or PROM) and associated socket, and other removable storage units 522 and interfaces 520, which allow software and data to be transferred from the removable storage unit 522 to computer system 500.

Computer system 500 may also include a communications interface 524.

Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 are in the form of signals which may be electronic, electromagnetic, optical, or other signals capable of being received by communications interface 524. These signals are provided to communications interface 524 via a communications path 526. Communications path 526 carries signals and may be implemented using wire or cable, fiber optics, a phone line, a cellular phone link, a RF link or other communications channels.

In this document, the terms "computer program medium" and "computer-usable medium" are used to generally refer to media such as removable storage unit 518, removable storage unit 522, and a hard disk installed in hard disk drive 512. Signals carried over communications path 526 may also embody the logic described herein. Computer program medium and computer-usable medium may also refer to memories, such as main memory 508 and secondary memory 510, which may be memory semiconductors (e.g., DRAMs, etc.). These computer program products are means for providing software to computer system 500.

Computer programs (also called computer control logic) are stored in main memory 508 and/or secondary memory 510. Computer programs may also be received via communications interface 524. Such computer programs, when executed, enable computer system 500 to implement the present invention as discussed herein. In particular, the computer programs, when executed, enable processor 504 to implement the processes of the present invention, such as the steps in the methods illustrated by flowchart 200 of FIG. 2, discussed above. Accordingly, such computer programs represent controllers of the computer system 500. Where the invention is implemented using software, the software may be stored in a computer program product and loaded into computer system 500 using removable storage drive 514, interface 520, hard drive 512 or communications interface 524.

The invention is also directed to computer program products comprising software stored on any computer-usable medium. Such software, when executed in one or more data processing device, causes a data processing device(s) to operate as described herein. Embodiments of the invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

While various embodiments of the present invention have been described above, it should be understood that they have been presented by way of example only, and not limitation. It will be understood by those skilled in the relevant art that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for prioritizing one or more packets in a network system, comprising:
   (a) allocating, in a communication device, network system resources to one or more packets with precedence identifiers; and
   (b) dynamically changing, in the communication device, a threshold level in the allocation of network resources based on a volume of the one or more packets with the precedence identifiers, wherein the allocation of the network resources comprises prioritizing a network resource queue space for the one or more packets with the precedence identifiers and then prioritizing the network resource queue space for one or more packets without the precedence identifiers in the remaining network resource queue space, if any, based on Quality of Service (QoS) requirements.

2. The method of claim 1, further comprising:
   (c) routing the one or more packets with the precedence identifiers to a node using the communication device; and
   (d) routing the one or more packets without the precedence identifiers to the node, using the communication device, if network resource queue space is available for the one or more packets without the precedence identifiers.

3. The method of claim 1, wherein step (a) comprises receiving, with the communication device, one or more packets formatted in accordance with an Internet Protocol version 4 (IPv4) or Internet Protocol version 6 (IPv6) communication protocol.

4. The method of claim 1, wherein step (a) comprises receiving, with the communication device, the one or more packets with the precedence identifiers, wherein each of the precedence identifiers comprises at least one of a differentiated service code field, an IPv6 flow label, an IPv6 traffic class, and an IP address.

5. The method of claim 1, wherein step (a) comprises placing the one or more packets with the precedence identifiers in a buffer that has a minimum, pre-assigned allocation of network resources dedicated to the buffer to ensure unencumbered transfer of the one or more packets with the precedence identifiers between the communication device and a destination within the network system.

6. The method of claim 1, wherein step (b) comprises allocating the network resources to the one or more packets with a high-priority precedence identifier as an increase in volume of packets with the high priority precedence identifier is received by the communication device.

7. The method of claim 2, wherein step (c) comprises routing the one or more packets with the precedence identifiers to another communication device, wherein the another communication device is configured to handle incoming packet traffic in substantially the same manner as steps (a) and (b).

8. The method of claim 2, wherein step (d) comprises discarding the one or more packets without the precedence identifiers, if the one or more packets with the precedence identifiers occupy substantially the entire network resource queue space.

9. A computer program product comprising a computer-usable non-transitory medium having computer program logic recorded thereon that, when executed by one or more processors provides prioritization of one or more packets in a network system, the computer program logic comprising:

first computer readable program code that enables the one or more processors to allocate network system resources to one or more packets with precedence identifiers; and second computer readable program code that enables the one or more processors to dynamically change a threshold level in the allocation of network resources based on a volume of the one or more packets with the precedence identifiers, wherein the allocation of the network resources comprises prioritizing a network resource queue space for the one or more packets with the precedence identifiers and then prioritizing the network resource queue space for one or more packets without the precedence identifiers in the remaining network resource queue space, if any, based on Quality of Service (QoS) requirements.

10. The computer program product of claim 9, the computer program logic further comprising:

third computer readable program code that enables the one or more processors to route the one or more packets with the precedence identifiers to a node in the network system; and fourth computer readable program code that enables the one or more processors to route the one or more packets without the precedence identifiers to the node in the network system, if network resource queue space is available for the one or more packets without the precedence identifiers.

11. The computer program product of claim 9, wherein the first computer readable program code comprises:

third computer readable program code that enables the one or more processors to place the one or more packets with the precedence identifiers in a buffer that has a minimum, pre-assigned allocation of network resources dedicated to the buffer to ensure unencumbered transfer of the one or more packets with the precedence identifiers between the communication device and a destination within the network system.

12. The computer program product of claim 9, wherein the second computer readable program code comprises:

third computer readable program code that enables the one or more processors to allocate network resources to the one or more packets with the precedence identifiers as an increase in volume of the packets with the precedence identifier is received by the communication device.

13. A system for prioritizing one or more packets in a network system, comprising:

a first hardware module to allocate network system resources to one or more packets with precedence identifiers; and a second hardware module to dynamically change a threshold level in the allocation of network resources based on volume of the one or more packets with the precedence identifiers received by a communication device in the network system, wherein the allocation of the network resources comprises prioritizing a network resource queue space for the one or more packets with the precedence identifiers and then prioritizing the network resource queue space for one or more packets without the precedence identifiers in the remaining network resource queue space, if any, based on Quality of Service (QoS) requirements.

14. The system of claim 13, further comprising:

a third hardware module to route the one or more packets with the precedence identifiers to a node in the network system; and a fourth hardware module to route the one or more packets without the precedence identifiers to the node in the network system, if network resource queue space is available for the one or more packets without the precedence identifiers.

15. The system of claim 13, wherein the first hardware module comprises:

a module to place the one or more packets with the precedence identifiers in a buffer that has a minimum, pre-assigned allocation of network resources dedicated to the buffer to ensure unencumbered transfer of the one or more packets with the precedence identifiers between the communication device and a destination within the network system.

16. The system of claim 13, wherein the first hardware module comprises:

a module to allocate network resources to the one or more packets with the precedence identifiers as an increase in volume of the packets with the precedence identifier is received by the communication device.

17. The system of claim 14, wherein the third hardware module comprises:

a module to route the one or more packets with the precedence identifiers to another communication device in the network system, wherein the another communication device is configured to handle incoming packet traffic in substantially the same manner as the first and second modules.

18. The system of claim 14, wherein the fourth hardware module comprises:

a module to discard the one or more packets without the precedence identifiers, if the one or more packets with the precedence identifiers occupy substantially the entire network resource queue space.

\* \* \* \* \*